United States Patent [19]

Hirohata

[11] 4,410,255
[45] Oct. 18, 1983

[54] ELECTROMAGNETIC DRIVE DEVICE FOR ELECTRO-MAGNETICALLY OPERATED SHUTTER

[75] Inventor: Michio Hirohata, Inagi, Japan

[73] Assignee: Canon Kabushiki Kaisha, Tokyo, Japan

[21] Appl. No.: 320,503

[22] Filed: Nov. 12, 1981

[30] Foreign Application Priority Data

Nov. 18, 1980 [JP] Japan ................................ 55-162150

[51] Int. Cl.³ .............................................. G03B 9/24
[52] U.S. Cl. .................................... 354/230; 335/222; 335/230; 354/234
[58] Field of Search ............... 354/230, 234, 235, 271; 335/222, 230

[56] References Cited

U.S. PATENT DOCUMENTS

| | | | |
|---|---|---|---|
| 4,303,326 | 12/1981 | Kiuchi et al. | 354/234 |
| 4,333,722 | 6/1982 | Lee | 354/271 X |
| 4,334,749 | 6/1982 | Saito et al. | 354/234 |
| 4,338,009 | 7/1982 | Lee | 354/234 X |

*Primary Examiner*—John Gonzales
*Attorney, Agent, or Firm*—Toren, McGeady and Stanger

[57] ABSTRACT

An electromagnetic drive device of an electromagnetically operated shutter has a permanent magnet which is of a square shape and is magnetized into a multipolar state; a rotation shaft disposed in parallel relationship with magnetic flux produced by the permanent magnet; and a hexagonal coil having an electric current supplied thereto and opposed to the permanent magnet in such a way as to perpendicularly intersect the magnetic flux of the permanent magnet. The hexagonal coil part at which the current is to be supplied and which produces a force in the reverse rotating direction of the hexagonal coil, when the current is supplied, is located outside of the plane of mangetic flux.

5 Claims, 5 Drawing Figures

ELECTROMAGNETIC DRIVE DEVICE FOR ELECTRO-MAGNETICALLY OPERATED SHUTTER

BACKGROUND OF THE INVENTION

1. Field of the Invention

This invention relates to an electromagnetic drive device for a shutter and, more particularly, to an electromagnetic drive device for a programmed electromagnetic shutter in which a coil is disposed within a magnetic field produced by a permanent magnet. Shutter stop blades are arranged to be driven by a Lorentz force exerted on the coil when the coil is energized with an electric current.

2. Description of the Prior Art

For forming a programmed electromagnetic shutter with an electromagnetic drive device of a moving coil type, the prior art includes a method wherein a printed substrate board, having a coil provided thereon by etching, is mounted on a sector ring and opposes a magnet to have each shutter stop blade driven thereby. This method is employed in a device called a printed rotor type electromagnetic drive device. With the electromagnetic drive device arranged in this manner, it has been impossible to have a rotation shaft positioned at the center of rotation of a moving part, such as the sector ring or the coil. Hence, the device is greatly affected by a frictional force produced by rotation of the moving parts. To increase the responsiveness of the device, the mass of each moving part must be as small as possible. In view of this, the printed rotor type electromagnetic drive devices in general have light-weight moving parts to improve responsiveness. The use of light-weight moving parts, however, results in the shortcoming that the absolute value of the output torque of rotation cannot be large. An electromagnetic shutter composed of such an electromagnetic drive device tends to have the shutter stop blades thereof make an erroneous action due to a force exerted from outside the camera. With an electromagnetic drive device of this type employed, it has been difficult to impart sufficient reliability to the operation of an electromagnetic drive shutter. Therefore, in the printed rotor type electromagnetic drive device, it has been impossible to obtain a large output torque by increasing the number of turns of the coil. In order to obtain an electromagnetic drive device that is sufficiently invulnerable to disturbance from outside by increasing the output torque, it is necessary to have a wound coil of a mass larger than a certain given value pivotally supported at the center of rotation of the coil; to have the coil opposed to a magnet; and to have the rotation of the wound coil transmitted to the shutter stop blades through a lever or the like. It is a recent trend to reduce the size of cameras. In the case of the above-mentioned electromagnetic drive device, which is known by the name of a meter type electromagnetic drive devices the device is required to be of a shape permitting incorporation thereof within a compact camera without difficulty. It is difficult to provide a meter type electromagnetic drive device which can be incorporated in a compact camera which has a sufficiently large output torque for driving the shutter stop blades without being affected by an outside force.

SUMMARY OF THE INVENTION

This invention is directed to the solution of the problem described above. It is an object of the invention to provide an electromagnetic drive device which is of the type generally called the meter type. The moving coil type has a rotation shaft of a coil disposed in a position away from the optical axis of a photograph taking lens and is capable of producing a sufficient degree of torque even when the device has a shape permitting incorporation thereof in a compact camera without difficulty.

These and further objects, features and advantages of the invention will become apparent from the following detailed description of preferred embodiments thereof taken in connection with the accompanying drawings.

DETAILED DESCRIPTION OF PREFERRED EMBODIMENTS

Figure 4:
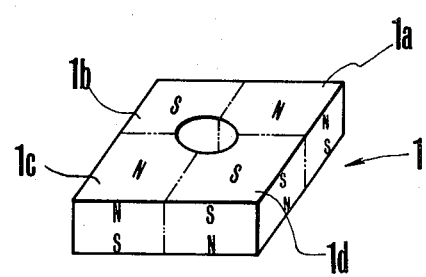
FIG. 4 is an oblique view showing the magnetized state of a permanent magnet according to the invention.

Referring now to FIGS. 1-4, a planar permanent magnet 1 is magnetized with a plurality of polarities in the plate thickness direction, and this permanent magnet 1 is divided into four blocks 1a–1d. The polarity of each block is arranged to be opposite that of the adjoining block, as shown in FIG. 4. A coil 2 is formed with a conductor wound around a core 3 having a hexagonal shape. The coil 2 has long sides AF and CD and short sides AB, BC, DE and EF. The relationship of these sides or segments is as shown below:

AF is parallel to CD, AB is parallel to DE, BC is parallel to EF.

AF is equal to CD, AB is equal to DE, BC is equal to EF.

Figure 1:
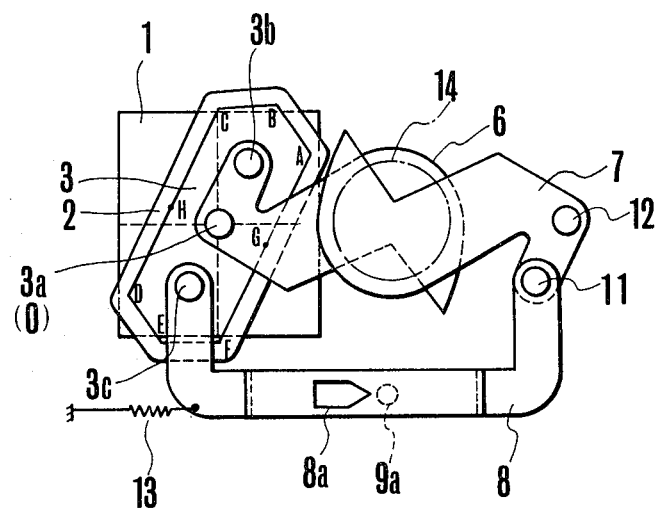
FIG. 1 is a plan view showing an embodiment of the invention having the shutter closed.
Figure 2:
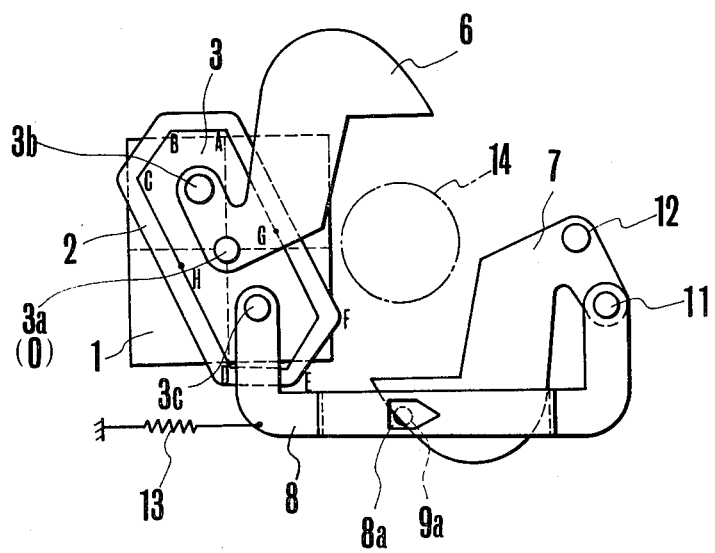
FIG. 2 is a plan view showing the embodiment having the shutter opened.
Figure 3:
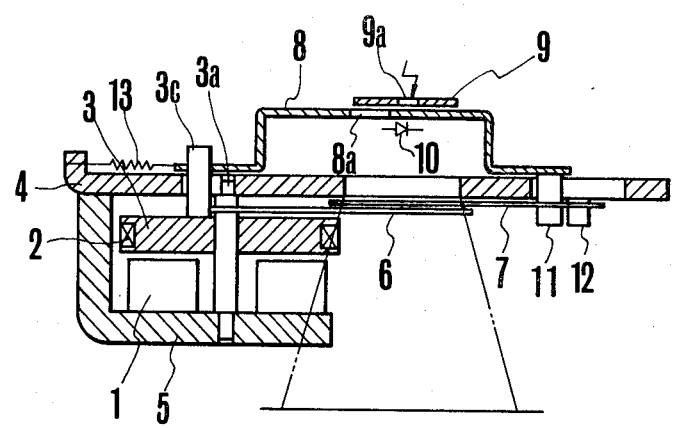
FIG. 3 is a sectional view of the embodiment shown in FIG. 1.

Furthermore, points C and F are aligned with a boundary line between adjacent blocks of the magnet 1, as shown in FIG. 1, when the electromagnetic drive device starts its movement. The points A and D are aligned with the boundary line between blocks of the magnet 1, as shown in FIG. 2, when the electromagnetic drive device completes its movement. When either pair of these points are aligned with the boundary line, the segments AB, BC, DE and EF, which include these points, are located outside of a magnetic field formed by the magnet 1. The segments AF and CD of the coil 2 have midpoints G and H. The core 3 is provided with a support shaft 3a which is secured to the center of rotation of the core 3. The support shaft 3a is mounted for rotation in a shutter base plate 4 and a yoke 5.

The core 3 is provided with transmission pins 3b and 3c, which are arranged at symmetrical points relative to the center of rotation of the core 3 and which are arranged for transmitting the rotation of the core 3 to shutter blades 6 and 7. The shutter blade 6 is rotatably supported by the support shaft 3a while the transmission pin 3b engages one end of the shutter blade 6. Meanwhile, the shutter blade 7 is rotatably supported by a support shaft 12. A linking lever 8 has one end thereof connected to the core 3 through the transmission pin 3c while the other end thereof is connected to the shutter blade 7 through a pin 11. The linking lever 8 is provided with an aperture 8a, which forms an auxiliary stop 9 for light measurement in combination with an auxiliary stop window 9a. The auxiliary stop 9 has a quantity of light incident upon a light sensitive element 10 corresponding to that of light incident upon the main stop of a photograph taking optical system. A return spring 13 is provided, which constantly urges the linking lever 8 in the direction of closing the shutter stop blades 6 and 7. The maximum stop of the photograph taking optical system is defined by an aperture 14. A magnetic circuit is composed of the permanent magnet 1, the shutter base plate 4 and the yoke 5. The shutter base plate and the yoke 5 are made of soft iron, low carbon steel and are thus arranged to have good efficiency.

The description of the operation follows. Each of the four blocks 1a–1d of the permanent magnet 1 is of a different polarity from that of the adjoining block, as shown in FIG. 4. The force exerted on each part of the coil is in accordance with the left-hand rule of Fleming. When a current is supplied to the coil 2 in a counterclockwise direction in response to a release operation on the camera. The direction in which a current flows to the coil 2 and the direction of the magnetic flux of a magnetic field through which the current flows determine the direction of the resulting force. Therefore, under the condition shown in FIG. 1, each of the segments AB, CH, HD, DE, FG and GA of the coil 2 produces a force including a component force which causes the coil to rotate counterclockwise. Meanwhile, the segments BC and EF of the coil do not produce any force because they are located outside of the magnetic field of the permanent magnet 1. Furthermore, the magnitude of the component force produced to rotate the coil 2 by the current flowing to each segment of the coil 2 due to a force of the magnetic field is as follows: The component force at the segment GAB is proportional to the difference (OB−OG) between the respective distances from the support shaft 3a of the core 3 (that is, the center of rotation 0 of the core 3) to the point B and to the point G. The component force at the segment CH is proportional to the difference (OC−OH) between the respective distances from the center of rotation 0 of the core 3 to the point C and to the point H. The component force at the segment HDE is proportional to the difference (OE−OH) between the respective distances from the center of rotation 0 of the core 3 to the points H and E. At the segment FG, the value of the component force is proportional to the difference (OF−OG) between the respective distances from the center of rotation 0 of the core 3 to the points F and G. Therefore, the sum of the component forces exerted on the whole coil 2 in the direction of rotation is proportional to a linear extent obtained by subtracting a value twice as much as the distance between the points H and G from a value obtained by adding the distance between the points C and F to a distance between the points B and E. Assuming that the sum of the component forces is Fb and the proportional constant is Ki, the above can be expressed by the following formula:

$$Fb = K_i(BE + CF - 2GH) \quad (2)$$

When the coil 2 is energized, this rotating force causes the core 3 to rotate counterclockwise on the support shaft 3a. This in turn causes the shutter blade 6, which is also supported by the support shaft 3a, to rotate counterclockwise by means of the transmission pin 3b. Meanwhile, the rotation of another transmission pin 3c is transmitted to the pin 11 through the linking lever 8 to cause the shutter blade 7 to rotate counterclockwise on the support shaft 12. As a result of this, the shutter blades 6 and 7 open the photograph taking optical path from the middle portion of the maximum shutter aperture window 14. Furthermore, in proportion to the opening action of the shutter blades 6 and 7 on the photograph taking optical path, the aperture 8a provided in the linking lever 8 overlaps the auxiliary stop window 9a to give light to the light sensitive element 10. The light sensitive element 10, which is connected to a shutter control circuit (not shown), then charges a capacitor with a current having a value corresponding to the quantity of the light received. When the capacitor is charged to a predetermined value, the shutter control circuit works to cut off the current supplied to the coil 2. Then, the bias of the return spring 13 causes the shutter blades 6 and 7 to rotate in a direction which closes off the photograph taking optical path. An exposure is completed when the optical path is thus closed.

As described in the foregoing, the points C and F of the coil 2 are disposed on the magnetization boundary line of the permanent magnet 1 when the coil 2 is in its initial position and the points A and D of the coil 2 are disposed on the magnetization boundary line of the permanent magnet 1 when the coil 2 is in the movement ending position thereof. With this arrangement, the coil 2 is prevented from producing a force in the direction of offsetting the driving action thereof, so that the permanent magnet 1 can be efficiently used. As will be clearly understood from the Formula (2) given in the foregoing, the value of the output of the coil 2 increases according to the sum of the lengths of the segments CF and BE. The length of the segment HG is assumed to be unvarying. However, the ratio of the length of the segment AD or CF to that of the segment HG is determined when the rotation angle is set. Therefore, in order to have the above stated value increased, the segment BE must be lengthened. On the other hand, however, the resistance of the coil 2 increases in proportion to the increase of the sum of sides of the hexagonal shape connecting the points A through G. It is not desirable to lengthen the segment BE to an extent which is more than necessary. In view of this, in accordance with this invention, the current of the coil 2 is efficiently used by arranging the length of the segment BE to have the segments BC and EF approximately coincide with the end faces of the permanent magnet 1 when the coil 2 is in its initial position and to have the segments AB and DE approximately coincide with the end faces of the permanent magnet 1 when the coil 2 is in its movement ending position.

Furthermore, assuming that the angle of rotation of the coil 2 is $2\theta$, the work W which can be represented by the product of the force produced by the coil 2 and the extent of the movement thereof can be approximately expressed, from Formula (2), as shown below:

$$W = K'\left(\frac{1}{\cos\theta} + 1 - 2\sin\theta\right) \times \theta \quad (3)$$

Since the output drops during the rotating process of the coil 2 when the value of $(1/\cos\theta)$ becomes a certain large value, the angle of rotation for obtaining the maximum degree of the work W may be obtained by selecting an angle of rotation that gives the largest value of the following formula within the range of $(1/\cos\theta) \approx 1$:

$$\frac{W}{K'} = 2\theta(1 - \sin\theta) \quad (4)$$

Accordingly, the angle of rotation may be set at $\theta \approx 30°$.

Figure 5:
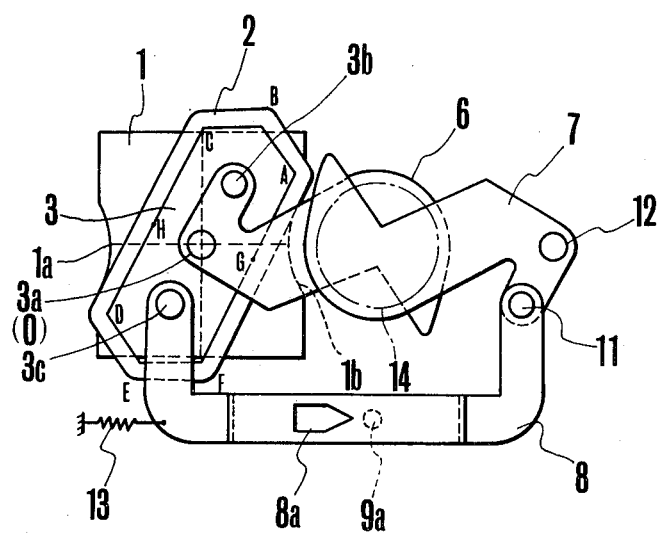
FIG. 5 is a plan view showing another embodiment of the invention.

Another embodiment of the invention, shown in FIG. 5, differs from the foregoing amendment in that the permanent magnet 1 used in this case is provided with cutaway parts which are arranged to facilitate placing the permanent magnet 1 within the camera body. More specifically, parts of the magnet 1, which are not participating in applying a magnetic flux to the coil 2, are cutaway in an arcuate shape along the circumference of the aperture window 14. This arrangement permits placement of the permanent magnet 1 within the camera body without increasing the size of the camera body. In accordance with this embodiment, a space for accommodating the permanent magnet 1 can be decreased without any adverse effect on the Lorentz force to be developed at the coil 2, so that it can be used for a compact camera.

The arrangement and operation of the other parts of the embodiment shown in FIG. 5 are identical with the foregoing embodiment.

In accordance with the invention, an electromagnetic drive device is composed of a square magnet, which can be easily placed in a space available within a camera, and a hexagonal coil, which is capable of effectively producing a torque when energized within the magnetic flux of the square magnet. The torque required for driving the shutter stop blades can be efficiently obtained to produce a sufficient force for operation of the shutter stop blades. The drive device, according to the invention, uses a small permanent magnet for control over the shutter blades to prevent the blades from making an erroneous action and is very easily utilized in a compact camera.

What is claimed is:

1. An electromagnetic drive device for a programmed electromagnetic shutter arranged to determine a shutter time and an aperture value by controlling an opening degree of blade members, said drive device comprising:
    a permanent magnet to form a magnetic field, said permanent magnet forming a first magnetic field and a second magnetic field which produces magnetic flux in a reverse direction to that of magnetic flux produced at the first magnetic field;
    a rotating member, which is made to effect an opening operation of said blade members corresponding to a rotation to a first direction, and at the same time to effect a closing operation of said blade members corresponding to a rotation to a second direction reverse to the first direction; and
    a coil provided at said rotating member, said coil including a first part always positioned within the first magnetic field irrespective of rotation of said rotating member, a second part always positioned within the second magnetic field irrespective of the rotation of said rotating member, a third part which is connected to the first part and at the same time retreats from within the first magnetic field corresponding to the rotation of said rotating member to the first direction then is positioned outside of the magnetic field, and a fourth part which is connected to the second part and at the same time is made to enter into the second magnetic field from outside of the magnetic field corresponding to the rotation of said rotating member to the first direction, wherein the first and second parts of said coil are connected together through the third and fourth parts.

2. A device according to claim 1, wherein said coil is made so that a point of intersection of the third and fourth parts is located at a position being more away from a rotation center of said rotating member than a line connecting a point of intersection of the first and third parts and a point of intersection of the second and fourth parts.

3. A device according to claim 2, wherein said coil has the third part respectively at one end of the first and second parts, and has the fourth part respectively at the other ends of the same, then is generally formed in an approximate hexagonal shape.

4. A device according to claim 3, wherein ends of said permanent magnet is formed in a linear shape.

5. A device according to claim 4, wherein said rotating member is biased to the second direction by a spring member.

* * * * *